United States Patent [19]

Boyes

[11] Patent Number: 4,834,343

[45] Date of Patent: May 30, 1989

[54] GAS LIQUID CONTACTING METHOD

[76] Inventor: Adrian P. Boyes, 102 Carpenter Road, Edgbaston, Birmingham, B15 2TT, England

[21] Appl. No.: 149,154

[22] Filed: Jan. 27, 1988

[51] Int. Cl.$^4$ .............................................. B01F 3/04
[52] U.S. Cl. ........................... 261/79.2; 261/DIG. 75; 366/165; 239/405; 239/427.3
[58] Field of Search ............... 261/79.2, DIG. 75; 366/165; 239/405, 427.3

[56] References Cited

U.S. PATENT DOCUMENTS

| | | | |
|---|---|---|---|
| 481,088 | 8/1862 | Chaney et al. | 239/405 |
| 1,071,447 | 8/1913 | MacDonald | 366/165 |
| 2,128,311 | 8/1938 | Mertes | 261/DIG. 75 |
| 2,840,454 | 6/1958 | Tomlinson et al. | 261/79.2 |
| 2,886,297 | 5/1959 | Crandall | 261/79.2 |
| 3,152,065 | 10/1964 | Sharp et al. | 239/405 |
| 3,476,366 | 11/1969 | Brooks et al. | 261/123 |
| 3,826,742 | 7/1974 | Kirk et al. | 261/119.1 |
| 4,000,227 | 12/1976 | Garrett | 261/DIG. 75 |
| 4,098,820 | 7/1978 | Couteau et al. | 261/DIG. 75 |
| 4,138,330 | 2/1979 | Garrett | 261/119.1 |
| 4,184,771 | 1/1980 | Day | 366/165 |
| 4,234,560 | 11/1980 | Kuerten et al. | 261/DIG. 75 |
| 4,251,505 | 2/1981 | Steiner et al. | 423/659 |
| 4,259,267 | 3/1981 | Wang | 261/DIG. 75 |
| 4,337,032 | 6/1982 | Duplouy et al. | 366/165 |
| 4,353,717 | 10/1982 | Herbrechtsmeier | 55/68 |
| 4,394,350 | 7/1983 | Cheng | 422/150 |
| 4,398,827 | 8/1983 | Dietrich | 366/107 |
| 4,446,108 | 5/1984 | Cheng | 422/156 |
| 4,498,819 | 2/1985 | El-Saie | 366/341 |
| 4,614,596 | 9/1986 | Wyness | 261/79.2 |
| 4,618,350 | 10/1986 | Rowe et al. | 55/92 |
| 4,726,686 | 2/1988 | Wolf et al. | 366/165 |

FOREIGN PATENT DOCUMENTS

| | | |
|---|---|---|
| 7846 | 2/1980 | European Pat. Off. . |
| 60192 | 9/1982 | European Pat. Off. . |
| 3408372 | 9/1985 | Fed. Rep. of Germany . |
| 1094231 | 3/1955 | France ............... 366/165 |
| 1035306 | 7/1958 | France ............... 261/79.2 |
| 7009279 | 12/1970 | Netherlands ........ 261/79.2 |
| 1581728 | 12/1977 | United Kingdom . |
| 2026339 | 2/1980 | United Kingdom . |
| 1596738 | 2/1981 | United Kingdom . |
| 2089234 | 6/1982 | United Kingdom . |
| 2177618 | 1/1987 | United Kingdom . |

Primary Examiner—Tim Miles

[57] ABSTRACT

A method of improving the contacting of a gas and a liquid by injecting liquid, together with the gas in the form of substantially uniformly sized bubbles, into a vertical column of the liquid so as to introduce both a vertical downflow along the column axis and a rotational movement of the liquid-gas mixture about the axis. Preferably at least a major part of the liquid and a part of the gas is introduced tangentially near the top of the column, the remainder being introduced axially as a high velocity stream from the top of the column.

7 Claims, 4 Drawing Sheets

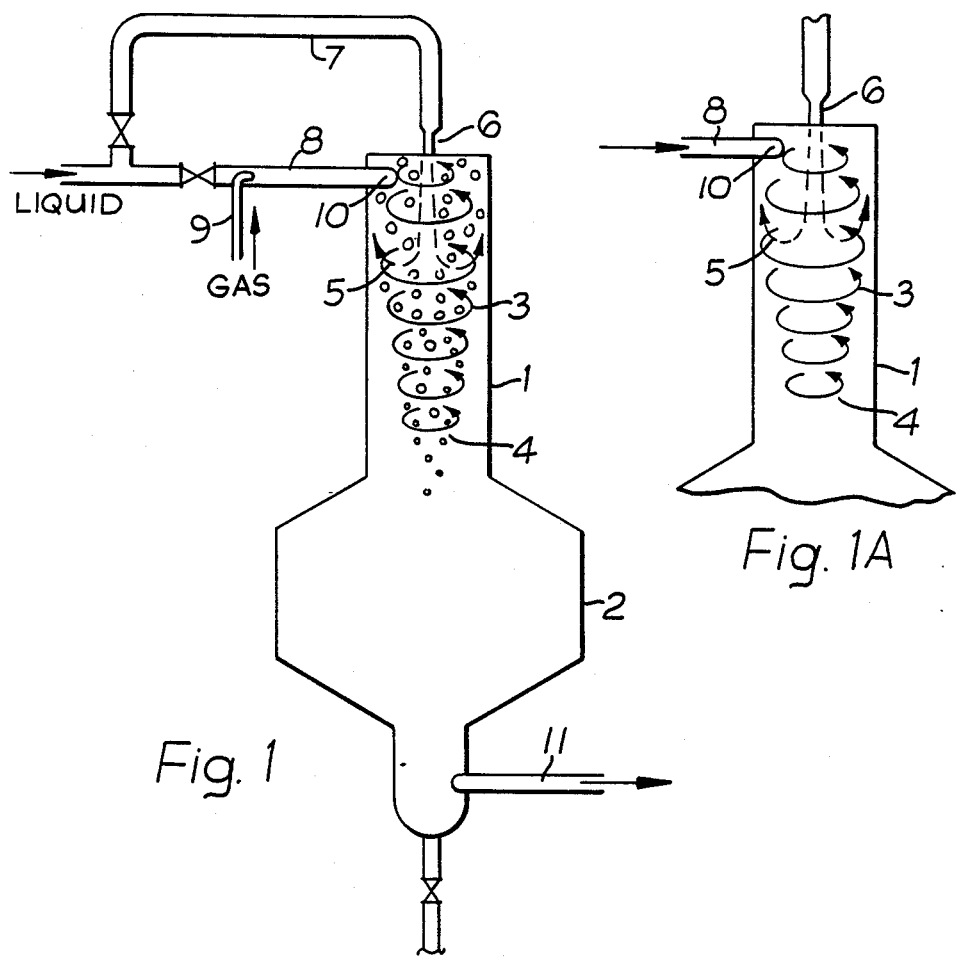
Fig. 1
Fig. 1A
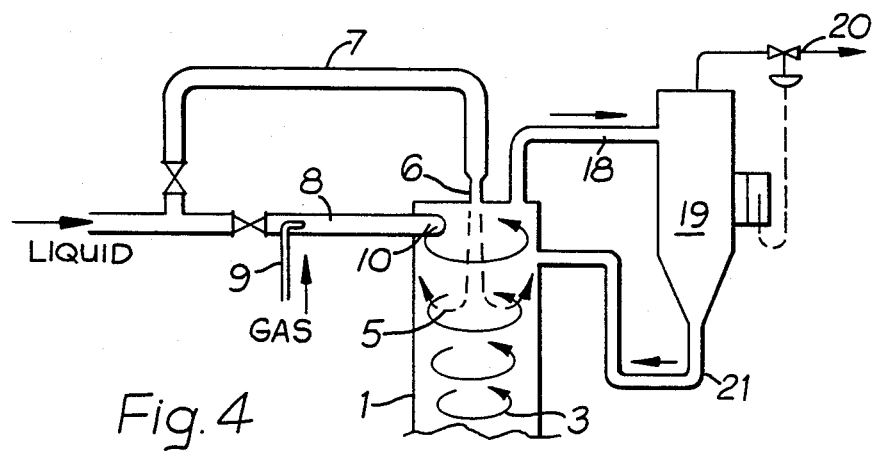
Fig. 4

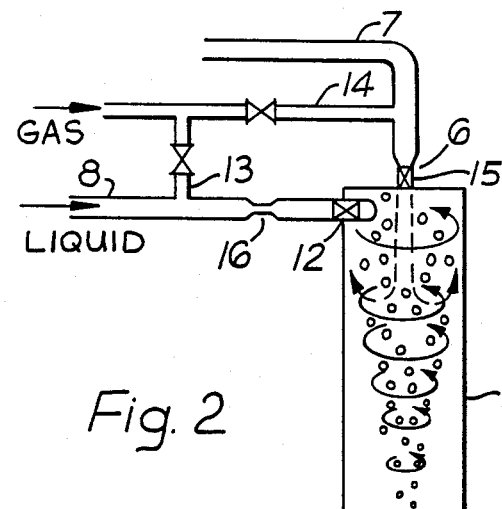
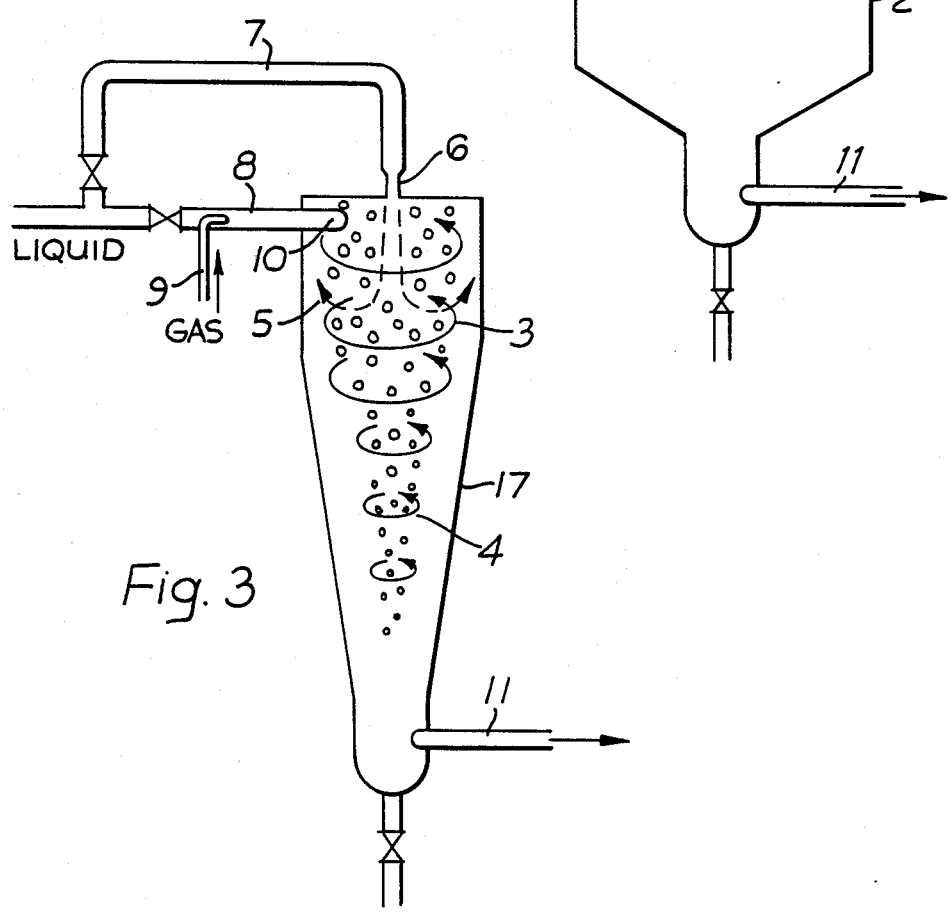
Fig. 2
Fig. 3

GAS LIQUID CONTACTING METHOD

FIELD OF THE INVENTION

This invention relates to gas/liquid contacting and to apparatus for carrying out the same.

BACKGROUND OF THE INVENTION

There are many technical processes in which it is desired to contact gas and liquid. In particular, mention may be made of dissolving oxygen, either as such or from air into water in order to aerate it, e.g. to supply oxygenated water to fish farming tanks or effluent treatment tanks. Likewise, substantial efforts have been devoted in dissolving carbon dioxide into water or aqueous mixtures in order to to make carbonated beverages. In addition to dissolving gases in liquids, gas/liquid contacting operations may be used to remove certain dissolved gases from a liquid, for example stripping dissolved oxygen in water using nitrogen.

Numerous other applications will occur to those skilled in the art and in this connection it should be observed that the term gas and liquid as used herein are to be widely interpreted. The term gas includes both gaseous mixtures of two or more gases, vapours and suspensions of liquid or solid materials in a gas or vapour. Likewise the term liquid includes mixtures of more than one liquid, whether the components are miscible or immiscible, and solutions or dispersions of gases or solids or both in a liquid. This also includes emulsions. A specific application of the process of the invention has been found to be in the treatment of viscous liquid triglyceride oils and fats with gaseous hydrogen in order to reduce the degree of unsaturation present in naturally occurring feedstocks. The process is particularly useful in the hydrogenation of polyunsaturated edible oils.

Many patent specifications have been published describing methods and apparatus for contacting gases and liquid. In many of these gas and liquid are fed to some form of vertical column and at least one stream, normally treated liquid, is led away from the column. Generally speaking the bulk liquid flow in the column is downward in order at least partially to counteract the upward flow of bubbles of the gas being treated due to their buoyancy.

U.S. Pat. Spec. No. 2,128,311, 3,476,366, 3,826,742 and 4,138,330 all describe apparatus for contact of gas and a liquid in which a liquid inlet stream is passed through a gas space at the top of the column to impinge on liquid on that column, i.e. waterfall effect. While such systems do operate to give contacting between gas and liquid, they tend to be inefficient in energy terms. In particular, the liquid stream loses substantial kinetic energy as it enters and passes through the gas space at the top of the column and this energy is accordingly not used for securing good contacting.

In all these and most downflow columns the dispersion of the gas into bubbles takes place in the column. Introducing the gas directly into the column or into a pipeline at normal velocities gives rise to a non-uniform bubble size, typically from 0.25 mm to 12.0 mm in diameter, with a high percentage of the larger bubbles. British Patent Specification No. 1,596,738 discloses a process in which a liquid stream is fed vertically into the top of a column at a velocity above a critical value. The process has a high energy consumption which sets up oscillating flow patterns which move first in one direction then stop and then rapidly move in another direction, sometimes reversing their direction, particularly in the lower half of the contacting zone. During these rapid changes in direction there is a tendency for pockets of bubbles to become trapped and near stationary, reducing the rate of mass transfer. In such stationary pockets liquid is enabled to drain from the bubbles which then coalesce and give rise to a very large size bubble. This rapidly rises to the top of the column and forms a layer of separated gas which leads to inefficient operation and which, if allowed to build up, precludes further operation of the device. In addition, as such large bubbles rise through the circulating froth, they promote further instabilities in the froth and the whole operation is destablilised as a result. Further, the severe oscillating nature of the bubble structure gives rise to numerous minute bubbles which are difficult to separate and can leave in the exit liquid stream.

It is therefore an object of the invention to provide an improved method of gas-liquid contacting. It is a further object of the invention to provide a method of gas-liquid contacting in which a mass of liquid and gas bubbles are formed and subjected to a rotational movement about a vertical axis and simultaneously to movement along the axis itself.

SUMMARY OF THE INVENTION

Thus according generally to the present invention there is provided a method of contacting a gas and a liquid which comprised introducing gas and liquid into a vertical downflow treatment column, dispersing the gas into the liquid in the form of bubbles and rotating the mass of liquid and gas bubbles in the column substantially around the central vertical axis of the column together with a superimposed vertical circulation movement along the vertical axis.

BRIEF DESCRIPTION OF THE DRAWINGS

While the specification concludes with claims particularly pointing out and distinctly claiming the subject matter which is regarded as forming the present invention, it is believed that the invention will be better understood from the following descriptions which are taken in conjunction with the accompanying drawings in which like designations are used to designate substantially identical elements and in which:

FIG. 1 is a schematic cross-sectional elevational view of an apparatus suitable for carrying out the present invention;

FIG. 1A is a similar view to that of FIG. 1 of the upper portion of the apparatus in the absence of gas flow;

FIG. 2 is a schematic cross-sectional view of an alternative form of apparatus to that shown in FIG. 1;

FIG. 3 is a similar view to that of FIGS. 1 and 2.

FIG. 4 is a schematic cross sectional view of a modified form of the apparatus of FIG. 1 in which a gas-liquid mixture is taken from the top of the apparatus and separated.

DETAILED DESCRIPTION OF THE INVENTION

Figure 6:
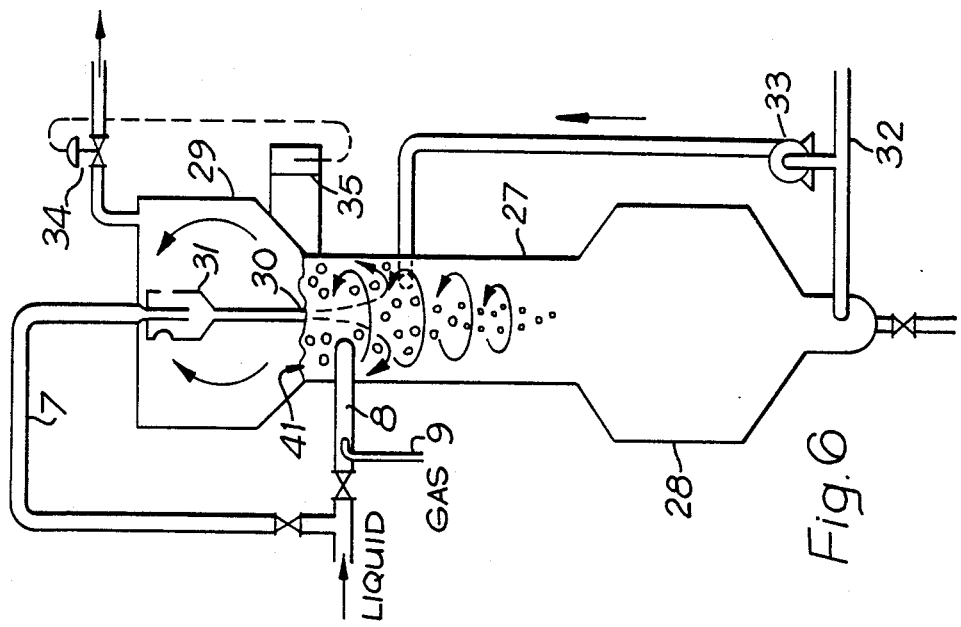
FIG. 6 is a modification of the apparatus shown in FIG. 5 and designed to operate with a separate gas phase at the top of the apparatus which is recirculated via a venturi ejector device to the axial liquid inlet stream.

The method comprises feeding part of the liquid or liquid/gas inlet stream tangentially to the column to induce the rotation of the mass of liquid and gas bubbles in the column, and feeding the remainder of the liquid or liquid/gas stream vertically downwards axially at the top of the column to superimpose a vertical circulation movement on the tangential rotational movement. To achieve the same desired combination of rotation and vertical motion all the feed may be introduced vertically and the rotational motion induced by use of a swirl device in the inlet pipe. The combination of the tangential and vertical flow inlet stream gives stability to the rotary motion of the liquid bubble mixture throughout the column and this is irrespective of whether the column is being operated in a fully flooded or partly flooded condition and is substantially independent of the relative proportions of gas and liquid in the circulating stream.

It is surprisingly found that the bubbles are substantially uniform. The amount of rotary motion imparted to the mass of liquid and gas in the column may vary quite widely. It must be sufficient to given an overall bulk rotary motion to the contents of the column, but it should not be so great that there is any excessive tendency to the formation of a gas vortex at the top of the column especially when operated in a flooded mode. When the downflow column is operating partly flooded, it is preferred that the inlet pipe with dispersed uniform bubbles in the liquid inlet stream enters below the interface of the column bubble dispersion.

The rotary motion may be imparted to the contents of the column by any convenient means, most suitably by arranging that the liquid and/or gas flowing into the column themselves have a rotary motion component. In the case of the liquid this is achieved most easily by introducing the majority of the liquid as one or more streams essentially tangentially to the wall of the column. The liquid introduced axially may flow through an appropriate nozzle or swirl tube which imparts to the stream of liquid emerging from the end of the nozzle or tube an appropriate rotary component motion. Relatively little rotary motion energy needs to be put into the column since once the rotary motion has started, it has substantial inertia. A typical rotational speed in a small column is 30 rpm.

Although most of the gas is dispersed as small uniform bubbles in the main tangential liquid inlet streams by means of a tube, orifice, or venturi in the pipe line, some gas can be introduced separately into the vertical axial stream or can be introduced separately tangentially or otherwise at one or more locations. Likewise liquid may be withdrawn from the column at one or more locations and may be processed as desired. For example, it may be recycled tangentially to the column or alternatively drawn off as a mixture of gas and liquid which is subsequently separated into treated liquid and gas. Any separation not achieved in the column can take place in a separate column, vessel or cyclone which may be fed tangentially.

Alternatively, the column may be made sufficiently long that a relatively bubble-free region forms at the base of the column from which essentially bubble-free treated liquid may be withdrawn as desired. The flow rate of gas and liquid may be so adjusted relative to one another that essentially all of the gas is used up in the column, e.g. by absorption or dissolution in the liquid so enabling very simple, accurate, direct ratio control of the system. Alternatively, in the partly flooded mode, not all of the gas is dissolved and the remainder emerges at the top of the bubble-liquid dispersion into a headspace at the top of the column from where it may be vented and/or recirculated.

It is often of value to introduce the rotary motion both at the top and at the base of the column: for example, some of the liquid may enter the top of the column tangentially, some vertically with uniform bubbles dispersed in it in the form of a rotating high velocity inlet stream, and a small amount of the exit liquid flow or feed may be recycled to the base of the column via a tangential inlet or swirl tube. Alternatively (or additionally) some gas may be introduced near the base of the column, or e.g. half way up it, in the form of a tangentially injected stream, to assist in imparting the desired rotary motion.

I have shown htat very much improved results can be obtained using a combination of tangential rotary and vertical motions, as described above, to the column of interacting gas and liquid. The results in Table 1 give a comparison between the unit as described in BP 1,596,738 feeding a liquid and dispersed gas vertically into the top of the column, adn that with 80.0% of the liquid and the gas fed tangentially and 20.0% of the liquid fed vertically to the top of the column in accordance with the present invention as illustrated in FIG. 1. The two columns were operated with identical gas and liquid flow rates under identical conditions dissolved oxygen in water. The column diameter was 102 mm, the column pressure 3515 kg/m$^2$, the exit oxygen concentration 21.0 ppm, and liquid flow rates varied form 0.65 to 0.95 kilograms per second.

TABLE 1

| Column | Liquid Flow Rate kilograms/sec | Height of Bubble Liquid Mixture meters | $K_1 \times 1000$ Mass transfer coefficient |
|---|---|---|---|
| BP 1,596,738 | 0.65 | 0.44 | 4.2 |
| | 0.79 | 0.66 | 3.3 |
| | 0.95 | 0.73 | 3.8 |
| Tangential/ | 0.65 | 0.31 | 6.0 |
| Vertical | 0.79 | 0.32 | 6.8 |
| | 0.95 | 0.34 | 7.6 |

The $K_1$, mass transfer coefficient, a measure of the column performance can be more than twice as high for the 80/20 tangential/vertical entry column compared with the vertical entry only column, i.e. BP Pat. No. 1,596,738. In addition to the higher $K_1$ value for the tangential/vertical column it is surprisingly found that the height of the bubble liquid mixture in the column is only 46.0% of that in the single vertical entry column, i.e. BP Pat. No. 1,596,738 at the higher liquid flow rates.

A further essential difference is that, in the 80/20 tangential/vertical column, the boundary between the bottom of the bubble liquid froth, and the separated liquid below this, is less clearly defined. There is a very pronounced swirl in the column and even though this swirl is induced at the top of the column, the swirling is still noticeable at the base of the column. The swirling is so pronounced that a clear single vortex can be seen down the axis of the column. Into this vortex small bubbles, i.e. 1.0 mm or less entrain, circulate, impinge on each other, coalesce to larger bubbles and then rise up the column into the froth where the bubbles are 4.0 mm in diameter. The rotational movement and vortex avoids any entrainment or small bubbles in the exit product.

I have also shown that improved results can be obtained by using combined axial rotary and vertical motions in the vertical downflow inlet stream as mentioned above to a column contacting a gas and a liquid. A comparison has been made between the gas contacting obtained with the unit described in BP 1,596,738 and that obtained according to the present invention by feeding the liquid and the gas axially with no tangential entry. A swirl device consisting of a flat strip twisted through 270° along its length was inserted in the inlet tube of one of the units. The two contacting units were operated at the same gas and liquid flow rates, dissolving oxygen into water. The column diameter was 102 mm, the column pressure 3515 kg/m$^2$ and the outlet oxygen concentration in the liquid was 21 ppm for a liquid flow rate of 0.8 kg/s. The mass transfer coefficient was increased by 30–50% and the bubble liquid mixture height was reduced by between 15–20%. These improvements are most substantial and point out the commercial importance of this method. However, the preferred method to induce the rotary motion is the tangential entry to the column wall which varied the mass transfer coefficient by more than 200%, reduced the bubble liquid mixture height by more than 100% and reduced the pressure loss by about a factor of 10.

The tangential/vertical entry downflow bubble column has an entirely different flow pattern and mechanism of mass transfer compared with that of the downflow column described in BP Pat. No. 1,596,738 and the more generally used water-fall type of downflow bubble columns. In such columns the impact of the vertical downflow inlet liquid stream generates a vertically downward and upward circulation movement in the top of the column. In the tangential/vertical entry column, due to the rotational movement, there is a liquid cyclone down the central axis of the column. This rotational movement throws or centrifuges the bubbles in the froth to the centre of the column and in so doing gives a large amount of bubble shearing resulting in the formation of some small bubbles of about 1.0 mm in diameter. With this shearing action there is created new surface area and much turbulence which greatly assists and improves the mass transfer process.

With rotational movement only and the movement of bubbles to the centre of the column a gas cyclone vortex is formed due to the collapse or coalesence of the central bubbles, the liquid/bubble froth mixture collapses and little mass transfer takes place. This collapse is avoided by introducing a vertical down flowing stream at the top of the column, preferably at a velocity greater than 150 cms/sec. into the vortex such that bubbles and gas are entrained away from the vortex downwards and upwards to the circumference of the column where they are again rotated.

The imposition of this vertical circulation on the tangential circulation further increases the shearing and turbulence of the bubbles and hence the mass transfer.

The superimposing of a vertical circulation on a horizontal rotational movement overcomes three difficulties in the operation of downflow bubble dispersion columns. Firstly, because of a lower velocity for the tangential feed compared with the vertical inlet feed there is a substantial reduction in the power required to operate the column. For example the energy required for the tangential/vertical column in Table 1 is 10.0–15.0% of that for the column of BP Pat. No. 1,596,738. Secondly, with a lower froth height and a higher mass transfer coefficient, a smaller height of column is required, thus reducing the capital cost. Thirdly, it reduces the amount of small bubbles carried away in the outlet of the saturated liquid at the base of the column. This is particularly so in low interfacial tension systems. Using a cone base at the bottom of the column as in a cyclone further increases the swirl and vortex formation to give the maximum separation of very small bubbles.

Thus, referring to FIG. 1, liquid is introduced by tube 7, into an orifice nozzle 6 leading axially into the column 1. Gas is introduced via tube 9 into liquid tube 8 and then into the column at tangential entrance 10, attached to the base of the column 1 is a separator section 2 from the base of which a tangential liquid exit pipe 11 branches off.

The gas in the tangential liquid feed stream is dispersed as small bubbles, the gas 9 entering the liquid stream 8 along the axis of the pipe, in the direction of the liquid flow. The rotary motion generated by the tangential inlet stream and the downflow and upflow circulation of the vertical liquid inlet stream causes the mixture of dispersed bubbles in the top of the column 1 to be circulated as in FIG. 1 and 1A in two directions. The rotary circulation is indicated by the arrows 3 and the downflow/upflow circulation by the dotted line 5. The pronounced swirl or vortex down the axis of the column, and the small bubbles in it, is illustrated by 4. This axial vortex separates the small bubbles, i.e. those of 1.0 mm diameter or less, from the liquid exit product. In so doing these small bubbles impact on each other, coalesce, and rise back into the bubble dispersion layer where the bubbles are about 4.0 mm in diameter.

The rotation movement of the incoming tangential liquid feed, which is desirably 70.0% to 90.0% of the total liquid feed, causes bubble to shear, circulate, and move to the centre of the column. The inlet downflow stream entrains bubbles or gas from the central vortex and circulates them downward and upward to the circumference of the column.

FIG. 2 shows an alternative version of the apparatus in FIG. 1 in which gas entering through pipe 13 is dispersed as bubbles via a venturi or orifice in the tangential feed line 8 and gas entering through pipe 14 upstream of the orifice tube 6 is dispersed in the vertical feed line 7. Swirler devices 12 and 15 each of which consist of helical plates are installed in the tangential and vertical feed line outlets so as to impart additional rotary motion. The localised additional rotary motion increases the turbulence and the rates of mass transfer.

FIG. 3 shows a modification of FIG. 1 where the body 17 is tapered at the base and is shaped as a cyclone. As the diameter of the tapered section decreases, so the rate of circulation in the axial vortex at the base of the column increases and becomes more effective in separating and coalescing minute bubbles from the near-saturated exit liquid product. The tangential/vertical feed cyclone type unit requires no separate base 2 as in FIG. 1 and thus the overall volume, size and capital cost of the apparatus is reduced.

FIG. 4 shows a modification of the apparatus of the invention which may be used, for example in gas stripping operations where it is necessary to vent gas from the top or side of the column whilst still operating the column in a flooded condition. In this embodiment a vent line 18 takes a mixture of gas and liquid from the top of the column and passes it to a cyclone type or other separator 19 in which gas and liquid are separated. The liquid is returned via a pipe 21 to the treatment column 1, while gas is either vented or recycled via a controller valve in the line 20. The arrangement of FIG. 4 can also be used in gas stripping operations, with a view to improving the efficiency by increasing the gas partial pressure and to load rather more gas into a treatment chamber than can be conveniently dissolved, the removal of the excess gas then allowing a flooded column operation to be maintained.

Figure 5:
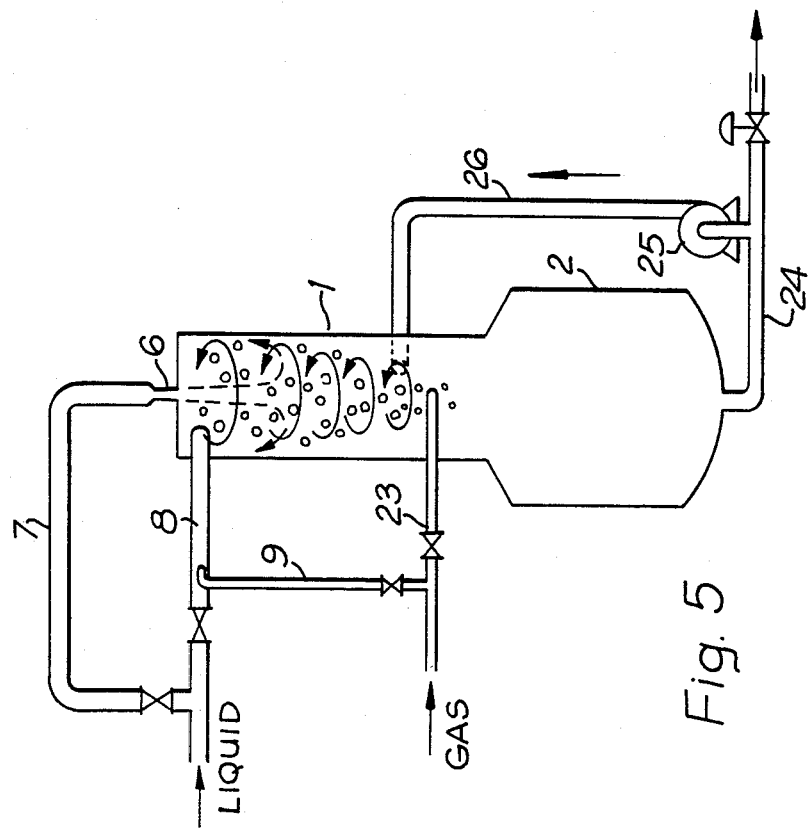
FIG. 5 is a schematic cross-sectional elevational view of an apparatus useful in the process of the invention incorporating two tangentially injected gas inlet streams and two liquid inlet streams, one of which is axial and the other tangential in direction.

FIG. 5 shows a further modification of FIG. 1 having three injected streams, viz a low quantity relatively high axial velocity liquid inlet stream, a lower speed tangentially injected main liquid stream with gas dispersed in it and a tangentially injected gas stream fed into the vortex towards the base of the column through pipe 23. If desired, swirler devices can be used in the axial or tangential streams. Also, if desired, a pump 25 may be activated; this abstracts treated liquid from an outflow pipe 24 and returns it in the form of a tangential liquid stream 26 through pipe to the column. Gas may also be introduced to this stream.

Figure 7:
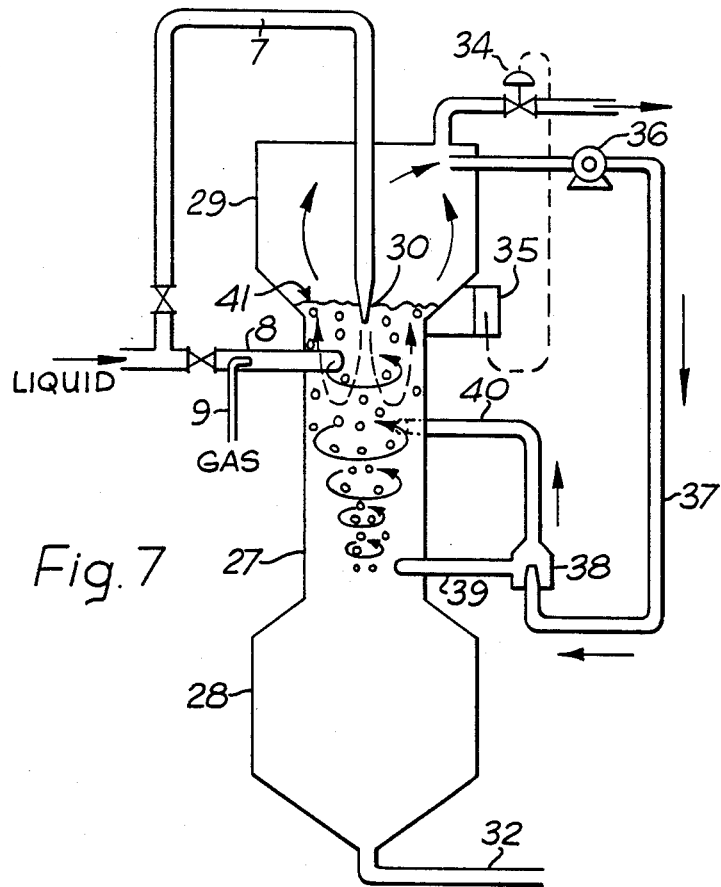
FIG. 7 is a modification of the apparauts shown in FIG. 6 with gas recirculated from the top of the apparatus via a venturi ejector device to a tangential liquid inlet stream in the body of the apparatus.

FIGS. 1 to 5 are operated in a fully flooded condition with no separate gas phase at the top of the column. FIGS. 6 and 7 show treatment columns which operate in a non-flooded condition, i.e. the mass of liquid-gas disperson or froth being contacted and circulated in the column has an "upper surface" or interface indicated at 41 in each of these figures. This interface is roughened and the liquid mass is made turbulent by the downward and subsequent upward movement of the liquid issuing from the inlet jet 30 below surface 41. This results in the collapse of some of the circulating bubbles impinging on this turbulent interface and a need to recycle and redisperse the gas if there is to be 100% absorption of the gas.

In each case, level 41 is at the top of a substantially constant cross-sectional central column section 27 which merges with an upper wider section 29 and a lower wider section 28. In each case gas in introduced via a pipe 9, liquid via pipes 7 and 8 and treated liquid is removed via a pipe 32 from the base of lower section 28. FIG. 6 mounted near the top of the column is a venturi ejector device designated 31 with the outlet stream from the ejector entering below the surface 41 of the liquid in column 27. A short helical member can be introduced at 30 to rotate the incoming liquid stream and add to the rotation of the liquid in the central part of the column.

The venturi ejectro device 31 automatically recirculates and redisperses the gas in the widened upper section 29 in the way shown by the arrows. The gas is redispersed as small bubbles in the liquid being treated in the column. Section 29 is widened to minimise the carry-over of liquid droplets in the recirculating gas.

The tangential inlet pipe 8 carrying the larger portion of the liquid feed stream with the dispersed gas, fed via pipe 9, is shown entering the side of the column. As shown in FIG. 6, a portion of the treated liquid from outlet pipe 32 can be recycled by pump 33 and fed tangentially to contacted column 27 to increase the rotation therein.

An alternative embodiment is shown in FIG. 7 in which, in place of recirculation of the gas from the head space within the wider portion 29, some gas is drawn off via fan 36 and piped and recirculated into a venturi ejector 38 and then tangentially into column 27 through pipe 40. Liquid from column 27 is recirculated via pipe 39 into the ejector 38. The dispersed bubbles in the tangential liquid inlet pipe 8 enter the bubble dispersion in the column 27 below the surface 41.

The devices of FIGS. 6 and 7 are provided additionally with a level controller 35 connected to a valve 34 set in the vent line. This allows excess gas to be vented from the wider section 29 as desired. This can be particularly useful in stripping operations.

As in the case of earlier embodiments, the non-flooded operating embodiments shown in FIGS. 6 and 7 may be operated at atmospheric, sub-atmospheric or super-atmospheric pressure and additional means may be used to ensure rotational circulation in the column, i.e. introducing part of the gas or liquid tangentially or otherwise than at the top of the column.

Figure 8:
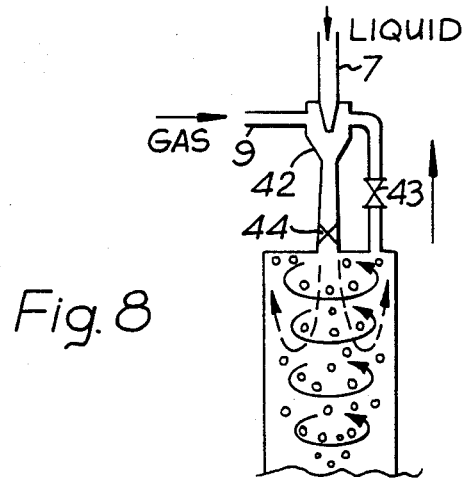
FIG. 8 is a modification of the FIG. 1 apparatus incorporating a venturi ejector device on the axial liquid stream to recirculate gas accumalated at the top of the apparatus.

FIG. 8 shows a modification of FIG. 1 with a vertical inlet where, if desired, any build up of gas at the top of the column may be recycled to the top inlet stream, e.g. as shown at 43 in FIG. 8. The suction of the upstream of the venturi ejector 42 recycles, and redisperses as small bubbles, any traces of gas which tend to separate at the top of the column and this assists in maintaining the column fully flooded. The helical member 44 rotates the incoming inlet liquid with gas dispersed in it and thus rotates the liquid in the centre of the column. Additional menas may be used to increase the rotational circulation in the column, e.g. by introducing part of the gas or liquid tangentially near the top of the column.

I claim:

1. A method of contacting a gas and a liquid in a vertical downflow contacting column which has an upper zone and a lower zone and a central vertical axis, said method comprising introducing gas and liquid into said upper zone so that the gas is present in said upper zone dispersed in liquid in the form of bubbles, circulating liquid or liquid iwth gas bubbles dispersed therein in said upper zone to cause rotational flow substantially around said central vertical axis, feeding liquid or liquid with gas bubbles dispersed therein axially downwardly along said central vertical axis within said rotional flow in said upper zone, thereby to cause separation of bubbles from liquid in said lower zone to form bubble-free liquid therein, and removing said bubble-free liquid from said lower zone.

2. A method according to claim 1 wherein said circulating and said feeding are such as to produce an axial vortex which separates gas bubbles from liquid wherein said bubbles impact on each other and coalesce and rise.

3. A method according to claim 1 wherein a major proportion of the liquid entering the column is introduced in the form of a wall tangential liquid stream near the top of the column, a minor proportion of the liquid entering the column is introduced as a relatively high velocity axial stream(s), and wherein gas is dispersed as small regular bubbles and introduced either via the axial liquid inlet stream or by the tangentially injected liquid stream at a position remote from the top of the column, or via both such routes.

4. A method of gas-liquid contacting according to claim 1 wherein all the liquid enters axially at the top of the column with a combined rotational and vertical downflow component induced by a swirl unit in the inlet tube.

5. A method according to claim 1 wherein at least part of the liquid introduced into the column is injected in the form of a wall-tangential liquid stream.

6. A method according to claim 5 wherein the gas is introduced into the column in said wall-tangential liquid stream.

7. A method as recited in claim 6 wherein part of the liquid is injected into the column in the form of a wall-tangential stream and the remainder is introduced into the column via an orifice nozzle leading axially into the column.

* * * * *